Feb. 14, 1950

W. J. KIENE 2,497,086

CHECK VALVE

Filed Sept. 7, 1944

INVENTOR
WILLIAM J. KIENE
BY R. E. Meech
ATTORNEY

Patented Feb. 14, 1950

2,497,086

UNITED STATES PATENT OFFICE 2,497,086

CHECK VALVE

William J. Kiene, Chicago, Ill., assignor to Dorothy S. Kiene, Chicago, Ill.

Application September 7, 1944, Serial No. 553,047

5 Claims. (Cl. 251—119)

This invention relates to maximum pressure indicators and particularly to an improved check valve arrangement therefor.

Heretofore, various types of indicators have been suggested and used for determining the maximum pressure in the cylinders of internal combustion engines and the like, or for determining the maximum pressure in any system containing fluid under fluctuating pressure. Such a pressure indicator is shown in my United States letters Patent No. 2,280,411, which issued April 21, 1942, and the indicator of the present invention is deemed to be an improvement thereover. While some of these indicators were practical and efficient in their use, others were unsatisfactory and inefficient. Most of the indicators heretofore suggested consisted of a multiplicity of parts which not only required an excessive amount of machining due to the close tolerances required in such an instrument, but also were difficult and laborious to assemble. Also, oftentimes the valves of such indicators would stick and not seat properly, resulting in leakage of the gases or fluid from the indicator and, consequently, an accurate pressure reading would not be obtained, thereby defeating the purpose for which it was intended.

Accordingly, it is one of the objects of the present invention to provide an improved check valve for a pressure indicator which is simple and inexpensive in its construction and one that consists of a minimum number of parts which can be easily and quickly fabricated and assembled.

It is another object of the invention to provide in a pressure indicator an improved check valve arrangement with the parts thereof so constructed and arranged that full and tight seating of the valve is assured at all times, thereby providing an indicator which is efficient and effective in its use.

It is a further object of this invention to provide an improved check valve assembly for a pressure indicator which is so constructed and arranged that the parts thereof are subject to a minimum amount of wear, thereby reducing the replacement and maintenance costs to a minimum.

It is still another object of the present invention to provide an improved check valve for pressure indicators and one in which both the valve and its seat are flexible, with the seating area of the valve being variable and controlled solely by the differences in pressure existing around and between the valve and seat, thereby insuring immediate seating of the valve at the instant that there is difference in pressure.

Various other objects and advantages of this invention will be more apparent in the course of the following specification, and will be particularly pointed out in the appended claims.

In the accompanying drawings, there is shown for the purpose of illustration, an embodiment which my invention may assume in practice.

Figure 1:
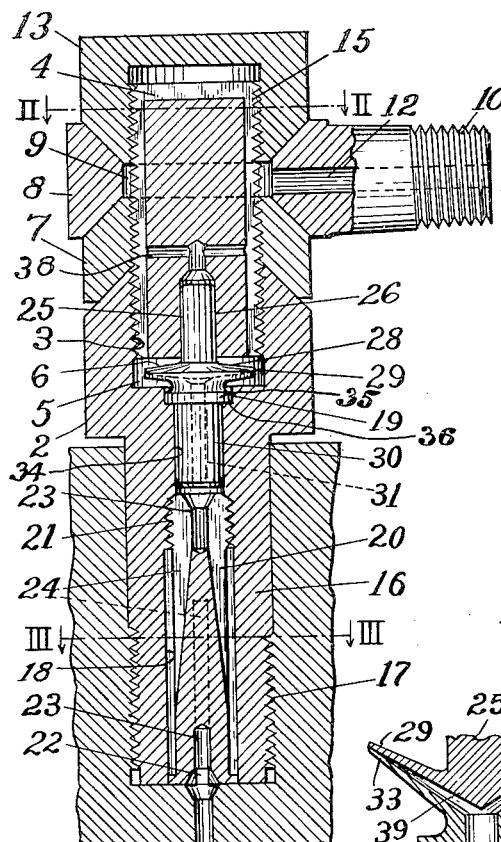
Fig. 1 is a longitudinal section through the improved check valve assembly of my invention.
Figure 2:
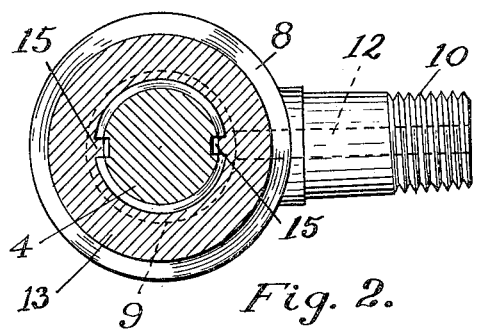
Fig. 2 is a sectional view taken on line II—II of Fig. 1.
Figure 3:
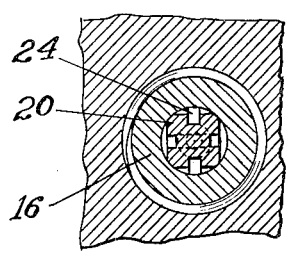
Fig. 3 is a sectional view taken on line III—III of Fig. 1.

Referring more particularly to the drawings, the improved check valve assembly of my invention comprises a body member 2, having an interiorly threaded cylindrical bore 3 arranged in one end thereof. There is arranged in the bore 3, an exteriorly threaded adjusting and guide screw or stud 4 which extends outwardly from the body member with the threaded portion thereof cooperating with the threaded portion of the bore. The screw 4 does not extend to the bottom of the bore, but is positioned therein so as to provide a cylindrical chamber 5 between the inner end of the screw 4 and the inner end of the bore. There is arranged in the chamber 5, the improved check valve 6 of my invention, the construction and function of which will be later described.

There is positioned on the exteriorly threaded portion of the screw 4, directly next to the end of the body member, a lock nut 7, which is adapted to lock the adjusting screw 4 in position in the body member 2. Directly next to the lock nut 7 there is mounted concentrically on the screw 4, an annular member or ring 8 having an inner diameter slightly larger than the exterior diameter of the screw 4 so as to provide an annular passageway 9 therearound directly opposite the annular member. There is carried by the annular member 8, a radially extending threaded connection 10 to which a pressure gage (not shown) may be attached by means of a union or flexible tube and which has a bore 12 which communicates with the annular passageway 9 around the screw 4. Directly next to the annular member 8 and on the outer end of the screw 4, there is mounted an interiorly threaded cap member 13 which is adapted to hold securely the annular member 8 in position and to provide a gastight joint at that end of the body member. The cooperating or abutting end surfaces of the body member 2, the lock nut 7, the annular member 8, and the cap 13 are preferably bevelled, as shown, so as to provide a better connection between these members. There is arranged on the screw or stud 4 and extending longitudinally thereof, preferably a pair of diametrically opposed slots or grooves 15, which communicate with the chamber 5 and the annular passageway 9.

The opposite end of the body member 2 is preferably reduced as at 16 and is exteriorly threaded at the end thereof as at 17, by which threaded portion the assembly is attached to the cylinder or system to be tested. This reduced end portion 16 has arranged therein, a cylindrical bore 18, preferably having a smaller diameter than the bore 3. At the inner end of the bore 18 there is disposed a valve seat member 19, the construction and function of which will be hereinafter described.

There is arranged in the bore 18, a longitudinally extending filter member or plug 20 which consists preferably of a piece of stock having the inner end thereof threaded as at 20, which threaded portion cooperates with a threaded portion 21 arranged adjacent the inner end of the bore 18 for holding securely the filter plug in position in the bore. The plug is slotted at each end thereof as at 22, with the slot at one end being arranged substantially perpendicular to the slot at the other end and the plug preferably bored at each end thereof as at 23, with these bores communicating with the respective slots 22. There is arranged in the sides of the plug 20, two pairs of diametrically opposed longitudinally extending tapered or feathered slots 24, with one pair disposed at each end of the plug and arranged perpendicular to each other. Each pair of tapered slots communicates with its respective slot 22 and bores 23 in the ends of the plug. On the end of the plug opposite the threaded portion 20, the corners thereof are machined preferably to fit the bore 18, and the corners of the plug between the threaded portion 20 and the opposite end portion are preferably machined to a slightly smaller diameter than that of the bore 18, so as to provide a narrow passageway for the fluid or gases around the central portion of the plug and between the flats on the square stock of the plug and the interior of the bore.

Figure 8:
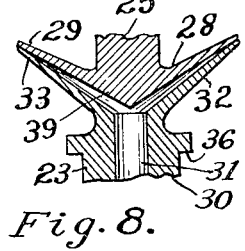
Fig. 8 is a view similar to Fig. 5, showing a modified valve arrangement in accordance with the present invention.
Figure 4:
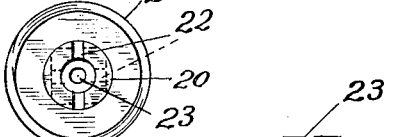
Fig. 4 is a view of the inner end of my improved check valve assembly.
Figure 7:
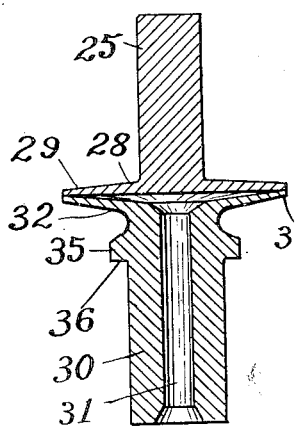
Fig. 7 is a longitudinal section through the filter plug taken 90 degrees from the position of same, as shown in Fig. 1.
Figures 5, 6:
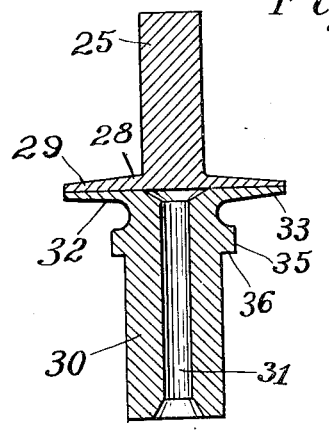
Fig. 5 is a longitudinal section through the improved check valve arrangement of my assembly, showing the parts thereof in their normal seated position.
Fig. 6 is a similar view showing the check valve in its fully seated position.

The check valve of the present invention, as more clearly shown in Figs. 5 and 6 of the drawings, comprises a cylindrical valve stem 25, which fits slidably into a bore 26 arranged in the inner end of the screw 4. The bore 26 communicates with a transverse passageway 38 in the screw 4, which communicates in turn with the longitudinal slotted passageways 15 in the periphery thereof, so as to vent the bore 26. There is arranged on one end of the valve stem 25, preferably integral therewith, a resilient disk-like metallic portion 28, which is adapted to act as a valve and is preferably tapered outwardly from the center to the periphery thereof so as to provide a relatively thin-lipped circumferential edge portion 29. The valve seat member 19 with which the valve 6 cooperates to open and close the valve, consists preferably of a longitudinally extending tubular member 30 having a bore 31 arranged therethrough. On one end of the tubular member 30, preferably integral therewith, there is arranged a similar resilient disk-like metallic portion 32, which likewise is preferably tapered from the center thereof outwardly to the periphery so as to provide a relatively thin-lipped circumferential edge portion 33. The disk-like portions 28 and 32 are disposed in superposed relation and it is important that they be constructed and arranged so that the contacting surface of one of them is concave relative to the opposed surface of the other, in order to provide a tapered space therebetween when they are disposed in their normal positions. While the contacting surface of the flexible member 28 may be concave and the contacting surface of the flexible member 32 may be relatively straight, it is desirable in most cases that the valve member 28 and the seat member 33 be arranged substantially 60 degrees to the axis of their members, as shown in the modification of Fig. 8 of the drawings. It is only necessary that the concavity of one contacting surface or face be slightly greater than the convexity of the opposed contacting surface or face by a sufficient amount to provide a tapered space therebetween. In other words, the working or contacting surface of one of the flexible disk-like members must be concave relative to the opposed surface of the other disk-like member in order to obtain the desired results and this is one of the most important aspects of the invention. Such an arrangement is provided in order that a variable seating area may be obtained between the flexible disk-like members in a manner hereinafter to be described.

The tubular body portion 30 of the valve preferably fits tightly into the inner end of a smaller bore 34 positioned in the body member between the bore 18 and the bore 30 and there is arranged on the tubular portion 30 adjacent the disk-like portion 32, preferably an annular flange 35 which rests on a shoulder 36 in the bore 34, so as to support the flexible portion 32 at a spaced distance from the end of the bore 34 and in the chamber 5 of the bore 3. By providing such a construction, it will be seen that both of the disk-like members 28 and 32 of the valve and valve seat, respectively, are disposed in the chamber 5 and are substantially surrounded by the gases or fluid trapped in the chamber 5. This is another important aspect of the present invention in that at the most extreme pressure differences encountered, the disk-like members support and contact each other and are surrounded at high pressures by the same body of fluid, thereby preventing any distortion of the valve or its seat.

The disk-like members 28 or 32 are tapered from the center outwardly to a relatively thin circumferential edge portion so as to provide an extremely flexible seat for the valve at the time of the initial seating thereof, so that the valve will seat effectively at relatively low pressure differences with a greater resistance to seating at higher pressure differences. In other words, the working surfaces of either one or the other of the disk-like members 28 and 32, should be thinner at the edge portion than at the center, so that the seating area increases progressively and rather rapidly at relatively low pressure differences and more slowly at high pressure differences, so as not to damage the valve parts.

The improved check valve assembly of my invention functions in the following manner:

After the assembly has been attached to the cylinder or source of fluid supply to be tested by means of the threaded connection 17 and the indicator gage or instrument is connected to the threaded connection 10 at the opposite end of the body member, the indicator is ready for use to test the pressure from the source of supply. It will be understood that the adjusting screw 4 is first adjusted so that the disk-like member 28 barely touches the seat or disk-like member 32 so as to provide substantially a line contact therebetween, as shown in Fig. 5 of the drawings, and is then backed off a slight amount to provide clearance. It will be seen that the bore 26 in the screw 4 acts as a guide for the valve stem 25 of the valve 6 during operation of the valve.

The gases or fluid pass from the source of supply into the bore 23 in the outer end of the filter plug 20 into the transverse slot 22 at that end of the plug and then pass into the feathered or longitudinally extending slots 24 along the sides of the plug and through the passageways at the corners thereof and into the longitudinally extending slots 24 at the other end, and into the transverse slot 22 in the inner end of the plug. It is the dual purpose of the filter plug to remove any solid particles or other foreign elements from the gases or fluid and to cool the gases. The gases then pass from the inner slot 22 into the bore 23 in that end and into and through the bore 31 of the tubular portion 30 of the valve seat member 23 between the disk-like members 28 and 32 into the chamber 5. The gases then pass up along the slots 15 in the sides of the screw 4 into the annular passageway 9 opposite the ring 8 and through the bore 12 of the connection 10 to the gage (not shown), where the pressure is indicated.

It will be understood that at equal pressure differences above and below the valve, that is, when the pressure in the chamber 5 and the pressure from the source of supply is balanced, the disk-like members 28 and 32 will establish substantially a line contact with each other. As the cylinder pressure decreases, the pressure in the chamber 5 will apply pressure to the exterior surface of the flexible members 28 and 32, thereby causing the contacting surfaces or faces thereof, to move toward each other, thereby establishing a greater seating area between these two members. In other words, as the cylinder pressure or pressure from the source of supply decreases, the seating area will progressively increase, as shown in Fig. 6, until the stiffness of the unseated portion of valve and seat balance the greatest differential encountered. The tapered thickness of valve and seat and the relative concavity of their surfaces should be such that the greatest pressure differential encountered will not cause a permanent distortion of either member. As it would be impossible to cut a simply formed surface as shown, that could come into full abutting relation without permanent distortion, tapering the thickness of these members gives a very thin flexible portion near the circumference which provides a hermetic seal at the outer portion and a relatively stiff portion near the center that is strong enough to resist any permanent deflection. When the pressure in the cylinder increases, the reverse takes place and the seating area of the contracting surfaces of the disk-like members will decrease until a line contact is again established at equal pressures. Due to the momentum of the valve, it will continue to lift until it takes up the very small amount of clearance allowed between the end of the stem 25 and the inner end of the bore 26, whereby its upward motion is stopped. The momentum contained in the valve results from the motion imparted to it by its spring-like character. The force of this spring action is set free by the equalization of pressures, but the motion of the valve and area of its opening is limited or regulated, by the screw 4.

In Fig. 8 of the drawings, there is shown a slight modification of the check valve in accordance with the present invention. In this construction, the flexible disk-like member 28' is convex with the faces thereof arranged substantially 60 degrees to the axis of the valve stem 25. In such case, the flexible disk-like portion 32' of the valve seat member 19 is concave with the working faces thereof, arranged slightly less than 60 degrees with the axis of the tubular portion 30 thereof, so as to provide normally a space 39 between the flexible members 28' and 32'. The concave-convex angular arrangement of the valve and valve seat substantially as shown in the modification, has been found the most satisfactory for most purposes.

Figure 9:
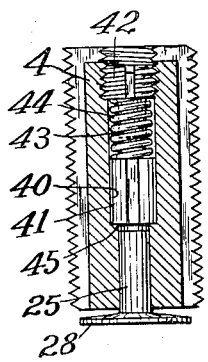
Fig. 9 is a longitudinal section through the screw 4 showing a modified arrangement for limiting the outward movement of the valve stem.

I have shown in Fig. 9 of the drawings, a modified stop arrangement for the valve stem 25, which consists of a reciprocable bored plug 40 mounted loosely in a bore 41 arranged in the upper end of the screw 4. The upper end of the bore 41 is threaded and there is arranged therein, an adjusting screw 42 having a reduced inner end portion or projection 43. There is arranged on the reduced inner end portion 43 of the screw 42 which extends between the same and the plug 40, a compression coil spring 44. The plug 40 cooperates with the inner end of the valve stem 5 and acts as a stop for the valve. In order to adjust the valve for proper clearance, the projection or reduced portion 43 of the screw 42, is set up against the plug 40 and the screw 4 is set to obtain the normal operating clearance for the valve and the screw 42 is then backed off a slight amount. The pre-load on the spring 44 is such that the plug 40 will be held against the shoulder 45 at the inner end of the bore 41 at moderate pressure differences, but will be lifted by the valve at relatively large pressure differences.

As a result of my invention, it will be seen that there is provided a check valve assembly having an improved check valve arrangement incorporated therewith which has extremely tight seating characteristics, with parts of the valve constructed and arranged so that they are not subject to damage or distortion due to a violent change in pressures in the indicator. It will be seen that the full seating of the valve is gradual and that the seating area is variable and progressive so as to eliminate sudden shocks to the mechanism due to a rapid change in pressure differential above and below the valve. While I have shown my improved check valve adapted to be connected with a pressure indicator, it will be understood that it may be successfully used with and adapted to any other instrument or device which requires such a valve arrangement.

While I have shown and described an embodiment of my invention, it will be understood that this embodiment is merely for the purpose of illustration, and description, and that various other forms may be devised within the scope of my invention as defined in the appended claims.

What I claim as my invention is:

1. In a device of the class described, a body member having an internally threaded bore, an exteriorly threaded member screwed into said bore to such position whereby a space is provided in said bore at the inner end of said exteriorly threaded member, a valve positioned in the space in said bore, said last mentioned member having at least one longitudinally extending slot arranged along the outer periphery thereof communicating with said space, an annular member encircling said last mentioned member having an inner diameter slightly larger than the outer diameter of said last mentioned member so as to provide an annular chamber therearound communicating with the slot in the periphery of said last mentioned member, said annular member having a connecting means arranged therewith together with a passageway communicating with said annular chamber for connecting pressure indicating means thereto, internally threaded connections arranged on said exteriorly threaded member cooperating with said annular member so as to hold the same securely in position on said exteriorly threaded member, and means for connecting said body member to the source of fluid supply.

2. A valve of the class described comprising a cylindrical valve stem having a resilient circular disk-like metallic valve portion arranged on one end thereof, a valve seat consisting of a member having a cylindrical portion and a similar resilient circular disk-like metallic portion integrally arranged therewith, said disk-like portions disposed in superposed relation and adapted to cooperate with each other to open and close the valve, said member having a passageway arranged axially therethrough, each of said disk-like portions being tapered from the center outwardly to the periphery thereof so as to provide a relatively thin-lipped circumferential edge portion therearound with the inner surface of one of said disk-like portions being concave relative to the opposed inner surface of the other disk-like portion so that substantially a line contact is established normally between said portions at equal pressure differences with the seating area of said disk-like portions varying as the pressure differences vary, said disk-like portions being constructed and arranged so that the seating area of the contacting surfaces thereof increases rapidly at relatively low pressure differences.

3. A valve of the class described comprising a cylindrical valve stem having a resilient circular disk-like metallic valve portion arranged on one end thereof, a cylindrical member having a valve seat arranged therewith, said disk-like portion and said valve seat disposed in superposed relation and adapted to cooperate with each other to open and close the valve, both said disk-like portion and said valve seat being tapered from the center outwardly to the periphery thereof so as to provide a relatively thin-lipped circumferential edge portion therearound, the inner surface of said disk-like portion and the seating surface of said valve seat being concave relative to each other so as to provide substantially a line contact normally therebetween at said thin-lipped portion at equal pressure differences with the seating area of said disk-like portion varying as the pressure differences vary, said cylindrical member having a passageway arranged axially therethrough, said disk-like portion and said valve seat being constructed and arranged so that the seating area of the contacting surfaces thereof increases rapidly at relatively low pressure differences.

4. A valve of the class described comprising a valve stem having an inherently resilient, circular disk-like metallic valve portion arranged on one end thereof, a valve seat comprising a similar resilient circular disk-like metallic portion, each of said disk-like portions being tapered from the center outwardly to the periphery thereof so as to provide a relatively thin-lipped circumferential edge portion therearound, the inner surface of the disk-like portion of said valve stem being convex and the inner seating surface of said seat being concave with the degree of convexity and concavity respectively of said disk-like portions being such that a space is provided normally therebetween when the thin-lipped edge portions are substantially in line contact with each other whereby the seating area of said disk-like portions is variable and increases progressively and rapidly at relatively low pressure differences.

5. In a device of the class described, a body member having an internally threaded bore, an exteriorly threaded member screwed into said bore to such position whereby a space is provided in said bore at the inner end of said exteriorly threaded member, said last mentioned member having a longitudinally extending slot arranged along the outer periphery thereof communicating with said space, a valve arranged in the space in said bore, said valve including a valve stem slideably positioned in a bore in the exteriorly threaded member with a resilient disk-like valve portion carried by said valve stem which cooperates with a similar resilient disk-like valve seat carried by the body member, means for connecting pressure indicating means to the exteriorly threaded member, said means having a passageway arranged therein communicating with the slot in the periphery of said last mentioned member, and means for connecting said body member to the source of fluid supply.

WILLIAM J. KIENE.

REFERENCES CITED

The following references are of record in the file of this patent:

UNITED STATES PATENTS

| Number | Name | Date |
|---|---|---|
| Re. 5,431 | Field | June 3, 1873 |
| 515,290 | Ives | Feb. 20, 1894 |
| 544,791 | Nicholson | Aug. 20, 1894 |
| 1,359,631 | Teed | Nov. 23, 1920 |
| 1,426,894 | Maranville | Aug. 22, 1922 |
| 1,583,535 | Dubrevin | May 4, 1926 |
| 1,586,226 | Tartrais | May 25, 1926 |
| 1,596,520 | Eskholme | Aug. 17, 1926 |
| 1,704,527 | Becker | Mar. 5, 1929 |
| 2,280,411 | Kiene | Apr. 21, 1942 |
| 2,338,679 | Wood | Jan. 4, 1944 |

FOREIGN PATENTS

| Number | Country | Date |
|---|---|---|
| 414,596 | Great Britain | Aug. 4, 1934 |
| 458,743 | Great Britain | Dec. 24, 1936 |